June 21, 1927.
J. W. DAWSON ET AL
BOTTLE COVER
Filed July 27, 1922
1,633,073
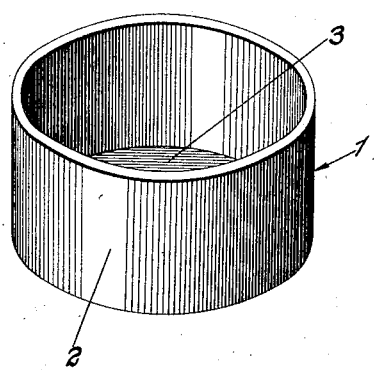
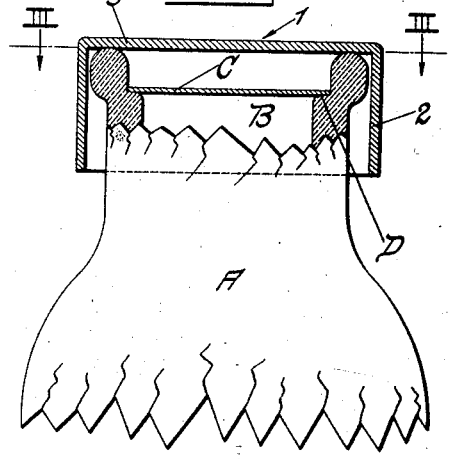
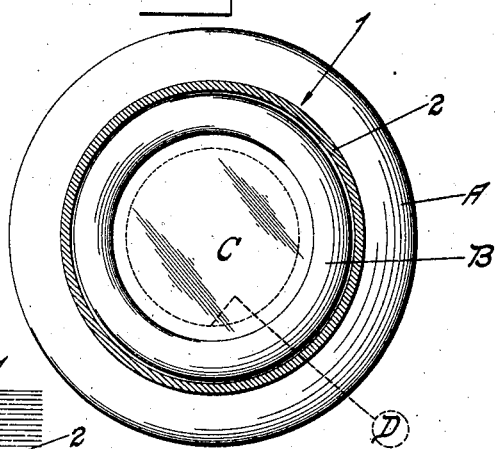
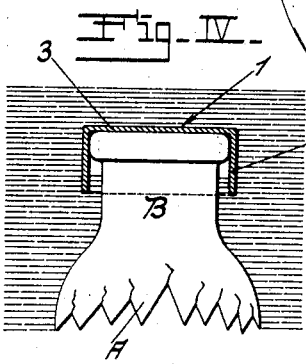
Inventors.
J. W. Dawson and J. L. Herold,
by Cook, McCauley
Their Attorneys.

Patented June 21, 1927.

1,633,073

UNITED STATES PATENT OFFICE.

JOSEPH W. DAWSON AND JAMES L. HEROLD, OF ST. LOUIS, MISSOURI, ASSIGNORS TO BARRY-WEHMILLER MACHINERY COMPANY, OF ST. LOUIS, MISSOURI, A CORPORATION OF MISSOURI.

BOTTLE COVER.

Application filed July 27, 1922. Serial No. 577,983.

This invention relates to improvements in bottle covers and particularly to bottle covers which are intended for use on milk bottles while the contents of said milk bottles are being Pasteurized.

Prior to this invention no entirely successful means has ever been evolved which would permit the Pasteurization of milk in the bottles in which said milk was to be marketed, the difficulty being that the cardboard bottle caps, which are used on milk bottles, would become saturated while said bottles were passing through the Pasteurizing machine, thereby destroying said bottle caps and permitting water from the machine to find its way into the bottles. The bottle covers disclosed in the present application are so constructed that they may be placed on the bottles after the milk has been placed in said bottles, and the cardboard caps placed thereon, and when in such position said covers will prevent the water within the Pasteurizing machine from coming into contact with said cardboard bottle closures.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. I is a perspective view of one of our bottle covers.

Fig. II is a fragmentary side elevation of a milk bottle showing a bottle cover in place thereon, the upper portion of the bottle and the bottle cover being in section.

Fig. III is a cross section on line III—III of Fig. II.

Fig. IV is a reduced view showing the position of the water relative to the bottle and cover when said bottle is passing through the Pasteurizing machine.

In the drawing, A designates a bottle of the type in which milk is marketed, said bottle being provided with a neck portion B adapted to receive a closure C in the form of a cardboard disk which rests upon an annular seat D within said bottle neck and effectually seals same.

1 designates our improved bottle cover which is made in the form of a cup, said bottle cover having an annular side wall 2 and a top wall 3. In use the bottle cover 1 is placed over the upper portion of the neck portion of the bottle A, the top wall 3 of said cover resting on the upper edge of the bottle neck and the annular wall 2 extending downwardly from said top wall 3 and surrounding the bottle neck (Fig. II).

The operation of our device during the Pasteurization of milk in bottles is as follows:

Assuming that the Pasteurizing machine being used is of the type wherein baskets containing bottles of milk are lowered into a body of water within said Pasteurizing machine and pass slowly through said body of water until said bottles finally reach the delivery end of said machine, where they are withdrawn from the machine. The bottles of milk enter the machine with the cardboard closure in place in the neck of the bottle and previous to the entry of said bottles one of the bottle covers 1 is placed over the neck portion of each of said bottles, as shown in Fig. II. The bottles pass downwardly into the body of water, and when the lowermost edges of the covers 1 pass below the surface of the water, a body of air is trapped within each of the covers 1 (Fig. IV). This trapped air will act as an air seal which will prevent the water within the machine from rising up within the covers 1 and overflowing onto the closures C, thus saturating said closures. The trapped air within each of the covers 1 passes entirely through the Pasteurizing machine, and as a consequence this air is Pasteurized; hence if, when the bodies of liquid within the bottles contract when said liquid begins to cool, some of this air is drawn around the closures C and into the bottles, said air will be Pasteurized and will not contaminate the milk within said bottles. The covers 1 are constructed of material of such thickness as to give to said covers sufficient weight to offset the tendency of the water to displace said covers.

We claim:

1. In a device for protecting the closure of a milk bottle submerged in a Pasteurizing liquid, a relatively heavy member impervious to moisture and supported by the upper portion of the milk bottle, within which member air is trapped, said member being provided with a top wall contacting with the upper edge of the neck portion of said bottle, and an annular downwardly extending side wall surrounding said neck portion of said bottle, said top wall being parallel throughout its width with said upper edge of the neck portion of said bottle, said annular downwardly extending side wall of said member being spaced from the adjacent side face of the bottle neck, said member being of sufficient weight to offset the tendency of said liquid to displace said member when in use, and said member being retained in place on the bottle by gravity only.

2. In a device for protecting the closure of a milk bottle submerged in a Pasteurizing liquid, a relatively heavy member impervious to moisture and supported by the upper portion of the milk bottle, within which member air is trapped, said member being provided with a top wall and an annular downwardly extending side wall, said member being so located on said bottle that it is suspended from and in contact with the upper edge only of the neck portion of the bottle, said member being of sufficient weight to offset the tendency of said liquid to displace said member when in use, and said member being retained in place on the bottle by gravity only.

3. In a device for excluding Pasteurizing liquid from the top of a bottle submerged therein, a cover in the form of an inverted cup surrounding and supported by the upper portion of the bottle and adapted to be submerged therewith, said cover having a downwardly extending side wall within which air is trapped to exclude the liquid from the top of the bottle, and the cover being of sufficient weight to offset the tendency of the liquid to displace said cover.

In testimony that we claim the foregoing we hereunto affix our signatures.

JOSEPH W. DAWSON.
JAMES L. HEROLD.